March 4, 1969 K. E. L. TOISCHER ET AL 3,431,312
HALTING PROCESS IN CONTINUOUS NITRATION OF AROMATIC HYDROCARBONS
Filed June 27, 1967
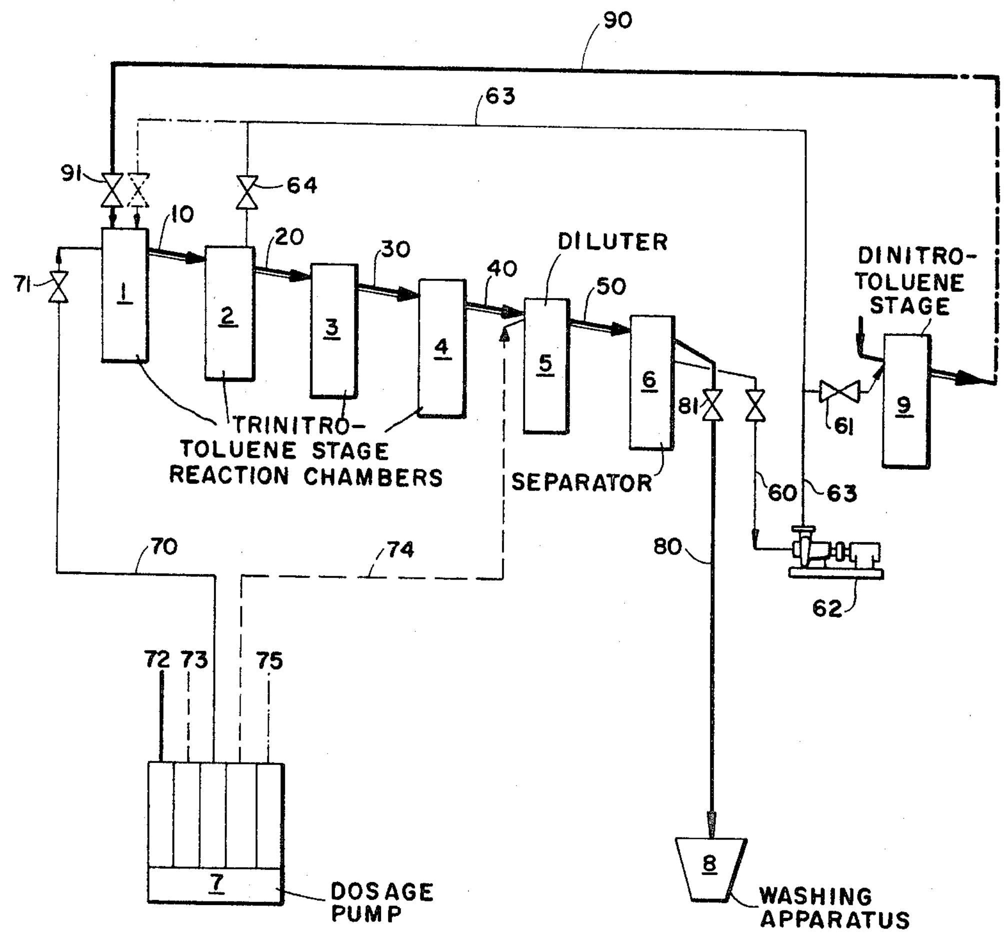
INVENTORS
Karl Engelbert Ludwig Toischer &
Horst Sigurd Max Bergmann
BY Spencer & Kaye
ATTORNEYS United States Patent Office 3,431,312

Patented Mar. 4, 1969

3,431,312

HALTING PROCESS IN CONTINUOUS NITRATION OF AROMATIC HYDROCARBONS

Karl Engelbert Ludwig Toischer and Horst Sigurd Max Bergmann, Cologne-Marienburg, Germany, assignors to Josef Meissner G.m.b.H. & Co., KG., Cologne-Bayenthal, Germany Filed June 27, 1967, Ser. No. 649,321
Claims priority, application Germany, July 2, 1966, M 70,075
U.S. Cl. 260—645 4 Claims
Int. Cl. C07c 79/12

ABSTRACT OF THE DISCLOSURE

In a process for producing a nitro aromatic compound by reacting aromatic hydrocarbons with a nitration acid in a plurality of nitration chambers arranged in cascade and succeeded by a separator, a method for safely bringing the process to the temporary halt by stopping the inflow of starting materials and the outflow of reaction products and recycling waste acid from the separator to one of the initial reaction chambers of the cascade until the secondary reaction in these chambers has been completed.

Background of the invention

The present invention relates to the production of nitro aromatic compounds, and particularly to the procedure for safely bringing such production to a temporary halt.

As is known, nitro aromatic compounds are produced by reacting aromatic hydrocarbons with a nitration acid, which consists of a mixture of concentrated nitric acid and concentrated sulfuric acid, continuous nitration being effected in a series of reaction chambers. The reaction mixture, which is composed of the nitration acid, aromatic hydrocarbons, nitrates of aromatic hydrocarbons of various nitration stages and the final nitration product, is passed through the reaction chambers connected in series to form a cascade arrangement. Once the nitration operation has begun, a specific mixture, in terms of the percentage concentration of each ingredient, and a specific reaction state will appear in each reaction chamber and will be maintained during the continuous nitration process.

In many cases it is not possible to immediately use the full output of the nitration unit and a storage of the nitro aromatic compounds is not desirable. In addition, a halt in the continuous operation of the nitration process causes difficult problems in that, on one hand, the reaction conditions existing when the nitration process is started again are not identical with the reaction conditions existing when the process was initially started and, on the other hand, the necessity exists to maintain the contents of each nitration chamber in such a reaction condition that they can be used when starting again.

Normally this is not possible because a halt in the continuous nitration operation which entails a halt in the inflow of materials and in the action of the agitators, is followed by a separation of the reaction components in the nitration chambers.

Furthermore, it is evident that large amounts of heat will be generated within short period of time at the interface of the resulting liquid phases and, consequently, serious explosions can occur. While this can be avoided by continuing stirring when the inflow of material is stopped, such a procedure results in an overflow of the contents from the chambers forming the cascade to the separator. For example, in the preparation of trinitrotoluene, the trinitrotoluene will be separated but the acid, however, will flow into the preconnected dinitrotoluene stage of the cascade, the trinitrotoluene drives out the dinitrotoluene and the latter overflows the separator in the trinitrotoluene stage. Additional dinitrotoluene enters the trinitrotoluene stage. The overflow of the cascade contents is prolonged and a reduction of the proportion of nitration acid and organic material results. The resulting reaction mixture contains a higher concentration of the organic phase and, therefore, when the nitration operation is restarted no useful nitration products are obtained, even if the nitration chambers have been filled in order to obtain a flow through the cascade.

Summary of the invention

It is the object of the present invention to overcome these drawbacks and difficulties.

A more specific object of the present invention is to permit the temporary stoppage of such a process while avoiding the problems enumerated above.

A further object of the present invention is to permit such a process to be rapidly restarted after having been stopped.

It is a still further object of the present invention to provide a continuous nitration process for the production of nitro aromatic hydrocarbons by nitrating aromatic hydrocarbons with nitrating acid in a cascade system of reaction chambers and a separator, the continuous nitration process being capable of being temporarily switched off without creating the disadvantages referred to above.

These and other objects according to the present invention are achieved, in a process for the continuous production of a nitro aromatic hydrocarbon by reacting an aromatic hydrocarbon, together with a mononitro or a dinitro aromatic hydrocarbon, with nitration acid in a nitration unit composed of a plurality of reaction chambers and a separator arranged in cascade, by the improvement residing in a method for halting the process which includes the steps of: halting the inflow of reaction material and nitration acid and the outflow of the nitrated reaction product; recycling waste acid from the separator to at least one of the initial reaction chambers of the cascade; and maintaining the flow of waste acid through the nitration unit until the secondary nitration reaction therein has terminated.

The present invention also involves improvements in apparatus for the continuous production of a nitro aromatic compound by reacting a starting material with a nitration acid, which apparatus includes a plurality of reaction chambers connected in cascade, a separator connected in cascade with the last chamber, reaction ingredient inputs, a reaction product output and a waste acid output. The improvement according to the invention includes conduit means connected for selectively placing the waste acid output in communication with at least one of the initial chambers of the cascade when the inputs and the reaction product output have been closed; and means for maintaining a circulation of waste acid through the conduit means from the waste acid output to the at least one chamber until the secondary nitration reaction in the chambers has been completed.

Thus, according to the present invention, the waste acid is fed through the nitration reaction chambers in a cyclic manner, with the mixtures and stirrers in the reaction chambers running, until the secondary nitration reaction has been completed. As a result, no changes will occur in the proportions of ingredients in each reaction stage or in the fluid level in each stage.

Preferably the waste acid is introduced into the second reaction chamber of the nitration cascade, since the concentration of the nitration acid in the first reaction chamber is very high and the concentration of waste acid is low. In view of this, the recycling of the waste acid into the first reaction chamber would cause an undesirable change in the acid concentration. Mixing or stirring in the first reaction chamber, which is outside of the waste acid recirculation path, is maintained during the secondary nitration reaction.

Brief description of the drawing

The single figure of the drawings is a schematic view of one arrangement for carrying out the method of the present invention.

Description of the preferred embodiment

The drawing shows a nitrating apparatus for carrying out the process according to the present invention for the production of trinitrotoluene over the dinitrotoluene stage with the possibility of stopping the continuous process.

The nitration apparatus consists of cascaded reaction chambers 1, 2, 3 and 4 of the trinitrotoluene stage, a diluter 5, a separator 6, a dosage pump 7 and a washing apparatus 8. The reaction chambers, diluter and separator are connected together in series by the conduits 10, 20, 30, 40 and 50. A further conduit 90 connects the reaction chamber 1 of the trinitrotoluene stage with dinitrotoluene stage 9. The dosage pump 7 is connected via the pipeline 70 having a valve 71 with the reaction chamber 1 of the nitration cascade and via the pipeline 74 with the diluter 5. The pipelines 90 and 70 are closable by the valves 91 and 71, respectively. Dosage pump 7 also has conduits 72, 73 and 75 connected to stage 9 for supplying mononitrotoluene, water and nitric acid, respectively, thereto. Nitration acid is supplied via pipeline 70 to chamber 1. The separator 6 is connected by a pipeline 60 having a valve with the feeding pump 62 which is also connected to the reaction chamber 2 via the pipeline 63. The latter is also connected to the dinitrotoluene stage 9 by a branch having a valve 61. The separator 6 is connected via a pipeline 80 having a valve 81 to the washing device 8. Waste acid flows out of separator 6 via line 60, while the final trinitrotoluene product flows therefrom via line 80.

The reaction chambers of the nitration cascade are equipped with mixer or stirrer arrangements.

According to one specific process by way of illustration in which the present invention may be incorporated, dinitrotoluene is first produced by reacting mononitrotoluene and nitrating acid in the dinitrotoluene stage and the resulting product is converted into trinitrotoluene in the cascade chambers of the trinitrotoluene stage. The resulting trinitrotoluene is separated from the waste acid in the separator stage. Then, during normal continuous running of the apparatus, the waste acid from the separator is delivered by a pump to the dinitrotoluene stage. However, when the process is to be brought to a halt, the inflow and outflow of material from the apparatus is stopped and the output from the pump is switchted in order to deliver the waste acid from the separator to the second chamber of the trinitrotoluene cascade, the recirculation of waste acid continuing until the completion of the secondary reaction processes in the cascade. In operation, the reaction mixture is conducted from the reaction chamber 1 through the conduit 10 to the reaction chamber 2, then through the conduit 20 to the reaction chamber 3, through the conduit 30 to the reaction chamber 4 and through the conduit 40 to the diluter 5. The mixture leaving diluter 5 flows through conduit 50 to the separator 6 and from there—in the normal operation of the continuous process—through the pipeline 60 and the pump 62 into the dinitrotroluene stage 9, whereas the piping 80 leads to the washing device 8.

Mononitrotoluene flows from the dosage pump 7 through the pipeline 72 into the dinitrotoluene stage 9, while water flows thereto through the pipeline 73 and, via the pipeline 74, water is fed to the diluter 5 of the trinitrotoluene stage and additional nitric acid is supplied via the pipeline 75 to the dinitrotoluene stage. A further pipeline 63 leads from the pump 62 to the reaction chamber 2, which pipeline may also be connected via a valve to the reaction chamber 1.

In case the trinitration stage has to be stopped for a more or less long period of time, the valves 71, 81 and 91 are closed and the output from pump 62 is switched to chamber 2 by closing valve 61 and opening valve 64. Thus, the inflow of reaction ingredients and outflow of trinitrotoluene are stopped, the waste acid from the separator 6 being conducted to the reaction chamber 2 of the trinitration cascade. The flow of the waste acid through the cascade is maintained, accompanied by stirring, until the secondary nitration reaction is finished. At this time the mixing or stirring apparatus may be turned off and the whole nitration unit can be safely stopped.

When restarting again the nitration process, the output from pump 62 is switched back to stage 9, and the valves 71, 81 and 91 are again opened. In a very short time the nitration unit begins to run as originally started, for the reaction chambers are filled to overflowing and no change in the proportions of ingredients has occurred.

The present invention could be applied to the production of other compounds such as, for example, nitrobenzene, nitrotoluene, dinitrotoluene, nitrochlorobenzene and the like.

It will be understood that the above description of the present invention is susceptible to various modifications, charges, and adaptations, and the same are intended to be comprehended within the meaning and range of equivalents of the appended claims.

What is claimed is:

1. In a process for the continuous production of nitro aromatic hydrocarbons by reacting a material chosen from the group consisting of aromatic hydrocarbons, mononitro compounds, dinitro compounds and mixtures thereof, with nitration acid in a nitration unit composed of a plurality of reaction chambers and a separator arranged in cascade, the improvement for halting such process comprising the steps of: halting the inflow of reaction material and nitration acid and the outflow of the nitrated reaction product; recycling waste acid from the separator to at least one of the initial reaction chambers of the cascade; and maintaining the flow of waste acid through the nitration unit until the nitration reaction therein has terminated.

2. A process as defined in claim 1 wherein said method further comprises maintaining a mixing action in the chambers until the completion of the secondary reaction.

3. A process as defined in claim 1 for the continuous production of trinitrotoluene wherein: the material reacting with nitration acid is dinitrotoluene; the reaction unit contains at least three reaction chambers; and said step of recycling waste acid is carried out by recycling the acid to the second reaction chamber of the cascade.

4. A process as defined in claim 3 wherein: the nitration unit further includes a dinitrotoluene producing stage and a pump which normally feeds waste acid from the separator to the dinitrotoluene stage; and said step of recycling waste acid is carried out by switching the pump output to the second reaction chamber.

References Cited

UNITED STATES PATENTS

| | | | |
|---|---|---|---|
| 3,043,867 | 5/1962 | Samuelsen | 260—645 X |
| 3,160,669 | 12/1964 | Terao et al. | 260—645 |

LELAND A. SEBASTIAN, *Primary Examiner.*

U.S. Cl. X.R.

23—266; 260—688